(12) United States Patent
Schupp et al.

(10) Patent No.: US 12,428,796 B2
(45) Date of Patent: Sep. 30, 2025

(54) METHOD OF INSTALLING A FOUNDATION AND A FOUNDATION FOR A STRUCTURE

(71) Applicant: ØRSTED WIND POWER A/S, Fredericia (DK)

(72) Inventors: Jens Schupp, Gentofte (DK); Jan Pedersen, Fredericia (DK); Jens Gengenbach, Hamburg (DE)

(73) Assignee: Ørsted Wind Power A/S, Fredericia (DK)

( * ) Notice: Subject to any disclaimer, the term of this patent is extended or adjusted under 35 U.S.C. 154(b) by 112 days.

(21) Appl. No.: 17/924,478

(22) PCT Filed: Apr. 20, 2021

(86) PCT No.: PCT/EP2021/060189
§ 371 (c)(1),
(2) Date: Nov. 10, 2022

(87) PCT Pub. No.: WO2021/228510
PCT Pub. Date: Nov. 18, 2021

(65) Prior Publication Data
US 2023/0175225 A1 Jun. 8, 2023

(30) Foreign Application Priority Data
May 13, 2020 (EP) .................................. 20174510

(51) Int. Cl.
*E02D 7/20* (2006.01)
*E02B 17/02* (2006.01)
(Continued)

(52) U.S. Cl.
CPC ................ *E02D 5/32* (2013.01); *E02B 17/02* (2013.01); *E02D 7/24* (2013.01); *E02D 7/28* (2013.01);
(Continued)

(58) Field of Classification Search
CPC .... E02D 5/32; E02D 7/24; E02D 7/28; E02D 27/12; E02D 27/525; E02D 27/425;
(Continued)

(56) References Cited

U.S. PATENT DOCUMENTS 1,173,355 A * 2/1916 Jones ........................ E02D 7/24
405/248
2,649,694 A * 8/1953 Pickman ................... E02D 7/24
405/248
(Continued)

FOREIGN PATENT DOCUMENTS

JP 2005325513 A 11/2005
WO 2007115573 A1 10/2007
(Continued)

OTHER PUBLICATIONS

International Search Report and Written Opinion; International Application No. PCT/EP2021/060189; Orsted Wind Power A/S; dated Jul. 26, 2021.

*Primary Examiner* — Edwin J Toledo-Duran
(74) *Attorney, Agent, or Firm* — SandBright, PLLC; Robert Dan Spendlove

(57) ABSTRACT

A method of installing a foundation (1) for a structure. The foundation body (2) has a toe (7) at its distal end which defines an aperture into an internal cavity (12) defined by an inner wall (8). Fluid is jetted from a plurality of nozzles (9) to direct fluid distally into the soil (5) ahead of the toe (7) during installation. A pump arrangement (13) controlled by a controller (16) is used to vary the quantity of fluid at a proximal end to thereby vary the fluid suspension pressure adjacent the toe (7) in a fluid communication channel (11) extending between the proximal end and the toe (7). The controller varies the fluid suspension pressure as the toe (7)

(Continued)

inserts deeper into the soil (5) based on a target fluid suspension pressure as a function of toe depth.

14 Claims, 3 Drawing Sheets

(51) Int. Cl.
| | |
|---|---|
| *E02D 5/32* | (2006.01) |
| *E02D 7/24* | (2006.01) |
| *E02D 7/28* | (2006.01) |
| *E02D 27/12* | (2006.01) |
| *E02D 27/52* | (2006.01) |
| *E02B 17/00* | (2006.01) |
| *E02D 27/42* | (2006.01) |

(52) U.S. Cl.
CPC ........... *E02D 27/12* (2013.01); *E02D 27/525* (2013.01); *E02B 2017/0039* (2013.01); *E02B 2017/0091* (2013.01); *E02D 27/425* (2013.01); *E02D 2600/10* (2013.01)

(58) Field of Classification Search
CPC ................. E02D 2600/10; E02B 17/02; E02B 2017/0039; E02B 2017/0091; E02B 17/027; E02B 17/00; E02B 2017/0073; E02B 2017/0078; Y02B 10/30
See application file for complete search history.

(56) References Cited

U.S. PATENT DOCUMENTS

| | | | | |
|---|---|---|---|---|
| 3,289,420 | A * | 12/1966 | Guy | E02D 7/00 405/226 |
| 3,638,433 | A * | 2/1972 | Sherard | E02D 5/72 405/50 |
| 3,815,374 | A * | 6/1974 | Hogan | E02D 7/24 175/21 |
| 3,817,040 | A * | 6/1974 | Stevens | E02D 7/24 114/295 |
| 3,824,797 | A * | 7/1974 | Wisotsky | E02D 7/26 173/1 |
| 3,852,971 | A * | 12/1974 | Phares | E02D 5/62 405/236 |
| 3,875,751 | A * | 4/1975 | Paus | E02D 3/12 405/263 |
| 3,889,482 | A * | 6/1975 | Frederick | E02D 5/08 405/253 |
| 3,922,869 | A * | 12/1975 | Wisotsky | E02D 7/00 405/228 |
| 3,938,600 | A * | 2/1976 | Essmeier | E02D 7/24 175/67 |
| 3,965,687 | A * | 6/1976 | Shaw | B63B 21/27 405/226 |
| 4,055,224 | A * | 10/1977 | Wallers | E21B 21/001 175/171 |
| 4,069,681 | A * | 1/1978 | Mott | E02B 17/027 405/226 |
| 4,189,255 | A * | 2/1980 | Macan | E21B 33/037 405/226 |
| 4,408,405 | A * | 10/1983 | Williams | E02D 7/24 37/322 |
| 4,484,835 | A * | 11/1984 | van Klinken | E02D 19/18 405/36 |
| 4,575,282 | A * | 3/1986 | Pardue, Sr. | E02D 5/42 405/195.1 |
| 4,659,257 | A * | 4/1987 | Verstraeten | E02D 5/385 175/20 |
| 5,002,434 | A * | 3/1991 | Massoudi | E02D 29/06 405/133 |
| 5,022,262 | A * | 6/1991 | Hulsbergen | E21B 7/185 73/170.32 |
| 5,399,056 | A * | 3/1995 | Shibazaki | E02D 5/36 405/269 |
| 5,435,668 | A * | 7/1995 | Shibazaki | E02D 5/36 405/269 |
| 5,758,993 | A * | 6/1998 | Schmednecht | E02D 19/18 405/274 |
| 5,951,207 | A * | 9/1999 | Chen | E02D 7/02 405/249 |
| 6,325,924 | B1 * | 12/2001 | Zaiger | E02F 5/28 210/220 |
| 7,621,059 | B2 * | 11/2009 | McCoy, Jr. | E02F 3/907 37/317 |
| 7,891,910 | B2 * | 2/2011 | Schakenda | E02D 27/52 405/226 |
| 8,215,873 | B1 * | 7/2012 | Lugo | E02D 5/80 405/251 |
| 10,113,290 | B2 * | 10/2018 | Nielsen | B63B 21/27 |
| 2009/0191004 | A1 * | 7/2009 | Schakenda | E02B 17/00 405/232 |
| 2011/0064526 | A1 * | 3/2011 | White | E02D 5/665 405/245 |
| 2011/0158752 | A1 * | 6/2011 | Hitchin | E02D 7/28 405/232 |
| 2011/0200399 | A1 * | 8/2011 | Schakenda | E02D 27/52 405/232 |
| 2012/0230773 | A1 * | 9/2012 | Foo | E02B 17/021 405/224 |
| 2016/0040384 | A1 * | 2/2016 | Wagner | E02D 5/80 405/257 |
| 2017/0130547 | A1 * | 5/2017 | Bhatnagar | E21B 17/02 |
| 2019/0292745 | A1 * | 9/2019 | Arntz | E02D 7/28 |
| 2019/0368153 | A1 * | 12/2019 | Molloy | E02F 5/02 |
| 2020/0248423 | A1 * | 8/2020 | Madsen | B23K 9/02 |
| 2020/0399851 | A1 * | 12/2020 | Olsen | E02D 5/24 |
| 2022/0267980 | A1 * | 8/2022 | Schupp | E02D 7/24 |
| 2025/0052027 | A1 * | 2/2025 | Hamdan | E02D 7/24 |

FOREIGN PATENT DOCUMENTS

| | | |
|---|---|---|
| WO | 2017203023 A1 | 11/2017 |
| WO | 2019206690 A1 | 10/2019 |

* cited by examiner

METHOD OF INSTALLING A FOUNDATION AND A FOUNDATION FOR A STRUCTURE

CROSS-REFERENCE TO EARLIER APPLICATION

This application is a § 371 National Stage Entry of PCT/EP2021/060189 filed Apr. 20, 2021 entitled "A METHOD OF INSTALLING A FOUNDATION AND A FOUNDATION FOR A STRUCTURE" which application claims priority to EP Application No. 20174510.6 filed May 13, 2020. The entire content of these applications are incorporated herein by reference.

The present invention concerns a method of installing a foundation, a foundation for a structure, a controller for use during the installation of a foundation, and software for controlling such a controller. In particular, the present invention concerns structural foundations, such as piles, tubular piles, monopiles, jacket piles, suction bucket/caisson foundations and suction anchors, and skirted foundations that may be inserted into a soil for supporting structures such as buildings, offshore structures, and wind turbines. It will be understood that suction bucket/caisson foundations are most suited to shallow foundations for jacket structures in water depths up to 100 m and in strong soils. Suction anchors are most suited for anchor chains to tie down floating oil platforms in the deep sea in soft sediments. The present invention is particularly suited to offshore foundations, and more particularly to open ended tubular foundation types, such as monopiles, jacket piles and suction buckets.

Structural foundations are typically installed by forcing the foundation into the ground using a pile hammer to apply a series of axial impacts for driving the foundation down into the soil in an insertion direction. Once installed, the foundation is axially supported by the friction applied to the lateral surfaces of the foundation's body and, to a lesser extent, the resistance to further penetration at the foundation's toe.

During installation, the toe at the distal end of the foundation displaces soil as it is driven down. This compresses the soil in the surrounding region. However, as the foundation is driven deeper, and pressure increases, the forces required to continue displacing soil at the foundation's toe also increase. At the same time, the surface area of the foundation in contact with the soil increases, leading to an increase in the shear forces required to overcome the frictional resistance to driving. As a result, the bearing resistance increases as the foundation is installed deeper into the soil.

In recent years, there has been a trend towards having larger monopile and other foundations, and this has exacerbated the above challenges of their installation. For example, higher impact forces and/or a higher number of hammer strikes are required for pile driving larger foundations. This in turn imposes significant failure resistance requirements on the foundation. At the same time, the noise generated by the larger impacts is also increased, which presents significant environmental and safety hazards.

In view of the above, various methods and systems have been proposed for making the installation of foundations easier.

In this connection, one solution involves the use of liquid excavation techniques in which high pressure nozzles are used to flood a body of soil with jetted liquid in order to excavate space for a foundation. With this type of conventional methodology, soil is removed in an uncontrolled manner, and the excavated site is effectively refilled with reclaimed soil once the foundation is in place. However, as the soil refilling the space is newly located, it has little developed structure and will therefore be inherently weaker as a result.

An alternative method is described in the applicant's own earlier patent application, published as WO2019/206690. In particular, WO2019/206690 aims to reduce toe installation resistance by using nozzles on the interior of the foundation to direct fluid laterally into a soil region radially inward of the foundation's interior wall, above the foundation's toe. As such, after soil has been displaced inward by the foundation's toe, it can be transported away from the displaced soil region in the fluid. A pumping system is also used to evacuate fluid from the internal cavity at the top of the foundation during installation. As such, compaction of soil within the displaced soil region is mitigated. This arrangement offers considerable advantages over the above described liquid excavation techniques because the fluid delivered by the nozzles is localised within the internal cavity, and disturbance of the exterior soil structure is minimised.

Nevertheless, as understanding of the failure mechanisms at the foundation's toe continue to evolve, there remains a need for new methods and systems for reducing installation resistance during installation of a foundation.

The present invention therefore seeks to address the above issues.

According to a first aspect of the present invention, there is provided a method of installing a foundation for a structure comprising: inserting a foundation body into a soil in an insertion direction, where the body has a toe at its distal end which defines an aperture into an internal cavity defined by an inner wall; jetting fluid from a plurality of nozzles provided at a distal end region of the body for directing fluid distally into the soil ahead of the toe; varying the quantity of fluid at a proximal end of the internal cavity using a pump arrangement; and controlling the pump arrangement using a controller to vary the fluid suspension pressure adjacent the toe in a fluid communication channel between the proximal end of the internal cavity and the toe formed between the inner wall and the soil, wherein the controller varies the fluid suspension pressure as the toe inserts deeper into the soil based on a target fluid suspension pressure as a function of toe depth.

In this way, during installation, the fluid jetted from the plurality of nozzles may cut into a region of soil distally below the toe, forming a suspension which extends in a fluid communication channel up from the toe to the water table at the proximal end of the internal cavity. As such, under the control of the controller, the pump arrangement can adjust the suspension pressure adjacent the toe by varying the quantity of fluid at a proximal end of the internal cavity using the pump arrangement. For example, the pump arrangement may lower or raise the water table by evacuating water from or feeding water into the internal cavity. This control allows the active earth pressure in the region of soil distally below the toe to be balanced by the fluid suspension pressure in a controlled manner. That is, by varying the fluid suspension pressure to a target suspension pressure, the exterior soil may be allowed to relax into the soil suspension in this region. At the same time, the suspension pressure may be kept sufficiently high to minimise the risk of ground or hydraulic failure, which would otherwise compromise the stability of the foundation. As such, by matching the suspension pressure to a target as the foundation is driven deeper, the structure of the soil can essentially be kept intact, whilst the relaxation allows the lateral earth pressure applied to the exterior wall of the foundation to be reduced. This in turn reduces the frictional resistance against the pile's exterior. Importantly, the claimed controller may vary the suspension pressure in response to changes in active earth pressure with installation depth. For example, the active earth pressure will generally increase with depth, although changes in soil characteristics between different soil layers may also reduce or increase the active earth pressure. Consequently, the claimed invention may account for these changes and provide a reduced installation resistance throughout the installation process.

The result of the above is that lower pile driving forces may be required for driven piles and, in some instances, installation may be possible without needing to apply hammer impacts. Once the foundation has been installed to the required depth, the fluid jetting system may then be turned off to allow fluid to drain away and for the soil to resettle.

In embodiments, the method further comprises the step of controlling the rate of fluid jetted from the plurality of nozzles to vary the fluid suspension pressure in the fluid communication channel. As such, the volume of fluid jetted from the nozzles may be increased or decreased for varying the suspension pressure. Typically, varying the rate of fluid influx is less preferred than varying the quantity of fluid at a proximal end of the internal cavity because it is relatively slow to respond when an increase in the suspension pressure is required. For example, excess fluid may take time to dissipate, and the extent to which flow rate can be reduced is limited by the need to maintain a sufficiently high jetting pressure to cut into the soil. That said, control of the fluid influx may provide a useful control parameter if the suspension pressure needs to be rapidly decreased, or a redundancy if the pump arrangement fails.

In embodiments, the target fluid suspension pressure increases with toe depth. As such, the target fluid suspension pressure may compensate for increases in active earth pressure as the foundation is inserted into the soil. It will be understood that the active earth pressure may increase lineally or non-linearly with depth, and may also reduce for periods were the toe is descending through particular soil layers.

In embodiments, the target fluid suspension pressure is determined based on the soil characteristics. As such, the target fluid suspension pressure may compensate for variances in the active earth pressure between different soil types and soil layers.

In embodiments, the target fluid suspension pressure is determined based on an estimated active earth pressure coefficient.

In embodiments, the method further comprises the step of determining a target fluid suspension pressure as a function of toe depth before the step of jetting fluid from a plurality of nozzles. In this way, the target parameters for implementation by the controller may be predetermined before the physical installation of the foundation commences. The installation may then progress based on these predetermined parameters, with the controller, for example, controlling the pump based on the parameters in order to maintain the target fluid suspension pressure as installation progresses.

In embodiments, the step of controlling the pump arrangement using the controller comprises the step of controlling based on received sensor inputs. In this way, the controller may provide feedback control during installation to maintain the target suspension pressure or a preferred installation rate.

In embodiments, the received sensor inputs comprise an input corresponding to the fluid suspension pressure adjacent the toe. In this way, the fluid suspension pressure is measured directly, thereby allowing rapid responses through the control parameters in order to maintain the target suspension pressure.

In embodiments, the received sensor inputs comprise an input corresponding to the installation resistance. In this way, detected installation resistance may be compared to a predicted installation resistance and, for example, if the installation resistance were to increase faster than anticipated, the suspension pressure may be lowered in response.

In embodiments, the step of varying the quantity of fluid at a proximal end of the internal cavity comprises the pump arrangement pumping water out of the internal cavity and/or feeding water into the internal cavity. In this way, the suspension pressure may be rapidly changed by altering the water table height within the internal cavity.

In embodiments, the method further comprises the step of keeping the fluid communication channel open between the proximal end of the internal cavity and the toe using means for separating the inner wall and the soil. For example, the means for keeping the fluid communication channel open may comprise a secondary array of nozzles distributed circumferentially and axially over the interior surface of the distal end region of the foundation body. These separating nozzles may provide a distribution of jets for maintaining separation between the interior surface and the opposing soil, around the internal circumference of the body and vertically up along its axis. Preferably, these secondary nozzles may be directed in a plane that is 90-180 degrees to the insertion direction for enhancing an upward movement of sediment.

According to a second aspect of the present invention, there is provided a foundation for a structure comprising: a foundation body for insertion into a soil in an insertion direction, where the body has a toe at its distal end which defines an aperture into an internal cavity defined by an inner wall; a plurality of nozzles provided at a distal end region of the body for jetting fluid distally into the soil ahead of the toe; a pump arrangement for varying the quantity of fluid at a proximal end of the internal cavity; and a controller for controlling the pump arrangement to vary the fluid suspension pressure adjacent the toe in a fluid communication channel between the proximal end of the internal cavity and the toe formed between the inner wall and the soil, wherein the controller varies the fluid suspension pressure as the toe inserts deeper into the soil based on a target fluid suspension pressure as a function of toe depth.

In embodiments, the foundation further comprises: a pressure sensor for determining the fluid suspension pressure; and an installation resistance sensor for determining the resistance to the foundation body's insertion into a soil, wherein the step of controlling the pump arrangement using the controller comprises the step of controlling based on sensor inputs received from the pressure sensor and the installation resistance sensor.

According to a third aspect of the present invention, there is provided a foundation for a structure comprising: a body for insertion into a soil in an insertion direction during installation, the body having a toe at its distal end, the toe defining an aperture into an internal cavity defined by an inner wall; one or more nozzles for directing jets of fluid distally into the soil ahead of the toe; a pump for evacuating fluid from the proximal end of the internal cavity; and means for maintaining a fluid communication channel between the proximal end of the internal cavity and the toe formed between the inner wall and the soil.

Preferably, the fluid comprises water. The fluid may be, for example, seawater, or an aqueous solution or suspension.

According to a fourth aspect of the present invention, there is provided a controller for controlling the installation of a foundation for a structure, the foundation comprising a foundation body for insertion into a soil in an insertion direction, where the body has a toe at its distal end which defines an aperture into an internal cavity defined by an inner wall, the controller comprising: a jetting control for controlling the jetting of fluid from a plurality of nozzles provided at a distal end region of the body for directing fluid distally into the soil ahead of the toe; and a pump control for controlling a pump arrangement for varying the quantity of fluid at a proximal end of the internal cavity, wherein the controller varies the fluid suspension pressure adjacent the toe in a fluid communication channel between the proximal end of the internal cavity and the toe formed between the inner wall and the soil, wherein the controller varies the fluid suspension pressure as the toe inserts deeper into the soil based on a target fluid suspension pressure as a function of toe depth.

According to a fifth aspect of the present invention, there is provided Software for operating a controller for controlling the installation of a foundation for a structure, the foundation comprising a foundation body for insertion into a soil in an insertion direction, where the body has a toe at its distal end which defines an aperture into an internal cavity defined by an inner wall, the software comprising: instructions for controlling the jetting of fluid from a plurality of nozzles provided at a distal end region of the body for directing fluid distally into the soil ahead of the toe; and instructions for controlling a pump arrangement for varying the quantity of fluid at a proximal end of the internal cavity, wherein the fluid suspension pressure is varied adjacent the toe in a fluid communication channel between the proximal end of the internal cavity and the toe formed between the inner wall and the soil, wherein the fluid suspension pressure is varied as the toe inserts deeper into the soil based on a target fluid suspension pressure as a function of toe depth.

Illustrative embodiments of the present invention will now be described with reference to the accompanying drawings in which:

FIG. 1 shows a schematic cross-sectional view of a foundation 1 according to an embodiment of the invention. In this embodiment, the foundation 2 is a monopile for installation in an offshore location.

Figure 1:
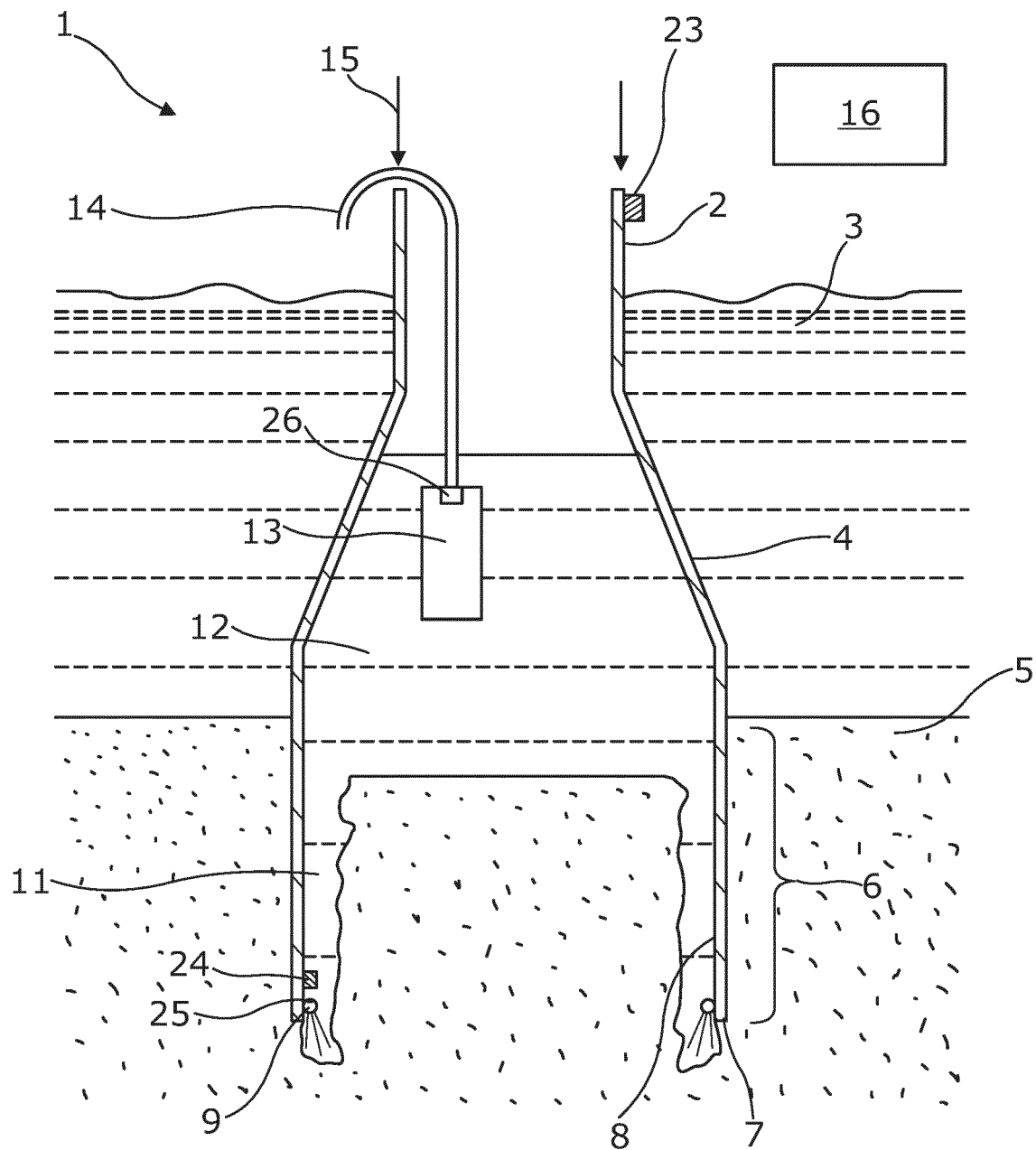
FIG. 1 shows a schematic cross-sectional view of a foundation according to a first embodiment of the invention.

The foundation 1 comprises a hollow tubular body 2 having an exterior surface 4, and an interior surface 8 that defines an interior cavity 12 in the form of a bore. In this example, the body 2 is provided with a conical section toward its proximal end. The distal part of the body 2 comprises an insertion section 6 for insertion into a soil 5 beneath the sea 3. The distal end of the insertion section 6 terminates in a toe 7, which defines an aperture into the internal cavity 12.

In this embodiment, the interior surface 8 is provided with a fluid jetting system comprising a nozzle array. This array comprises a plurality of cutting nozzles 9 which are located at or adjacent the toe 7 and are directed distally for jetting high pressure fluid down into the soil ahead of the foundation's toe 7. In embodiments, the cutting nozzles are located within 10 cm of the toe 7, and more preferably within 2 cm.

In this embodiment, the cutting nozzles 9 may jet fluid at between 200 and 400 bar, which penetrate into the soil by 10-20 cm in use, depending on the soil characteristics. The jetted fluid acts to cut into and erode the soil ahead of the toe 7 in its insertion direction 15. The plurality of cutting nozzles 9 are arranged around the circumference of the toe aperture and are fed by high pressure feed pipe system (not shown).

The interior of the foundation is further provided with a pumping arrangement 13 which connects to the water table within the interior of the foundation during installation. The pumping arrangement 13 is used to adjust the water table height within proximal section of the internal cavity 12 by feeding water into or evacuating water out of the cavity 13 using pipe 14. In this embodiment, a single pump and pipe is shown, although it will be understood that the pumping arrangement 13 may comprise separate inlet and outlet pipes driven by one or more pumps. In embodiments, the pumping arrangement's inlet may alternatively be provided by a controllable valve, activatable to open to allow sea water to drain into the internal cavity 12. In embodiments, the pumping arrangement may be provided in the foundation's cable holes, and hence will be located 3-4 m above the seabed at final installation depth. Such arrangements therefore may not require pipe 14.

In embodiments where the foundation body 2 is a closed ended pile, the pumping arrangement 13 may alternatively be provided above the water table and operate to increase or reduce the air pressure within the internal cavity 12.

A controller 16 is provided for controlling pump 13 to adjust the water table height within the internal cavity. In this embodiment, the controller 16 may also vary the flow rate of fluid jetted from cutting nozzles 9. The controller 16 may, for instance, be provided on a ship or jack up vessel used during installation of the monopile.

During installation, the foundation body 2 is lowered through the sea water 3 and the toe 8 moves in the insertion direction 15 to axially penetrate downward into the soil 5.

The foundation body 2 is forced in the insertion direction 15 under its own weight. In some embodiments, additional ballast weights may be used to increase the driving weight of the foundation. In some situations, it may be necessary to apply hammer impacts to the proximal end of the body 2 to drive the foundation downward.

During installation, the cutting nozzles 9 are activated to direct high pressure jets of fluid into the soil ahead of the toe 7. This acts to cut into the soil a short distance and break up this soil in this region immediately beneath and radially inward of the toe 7.

Figure 2:
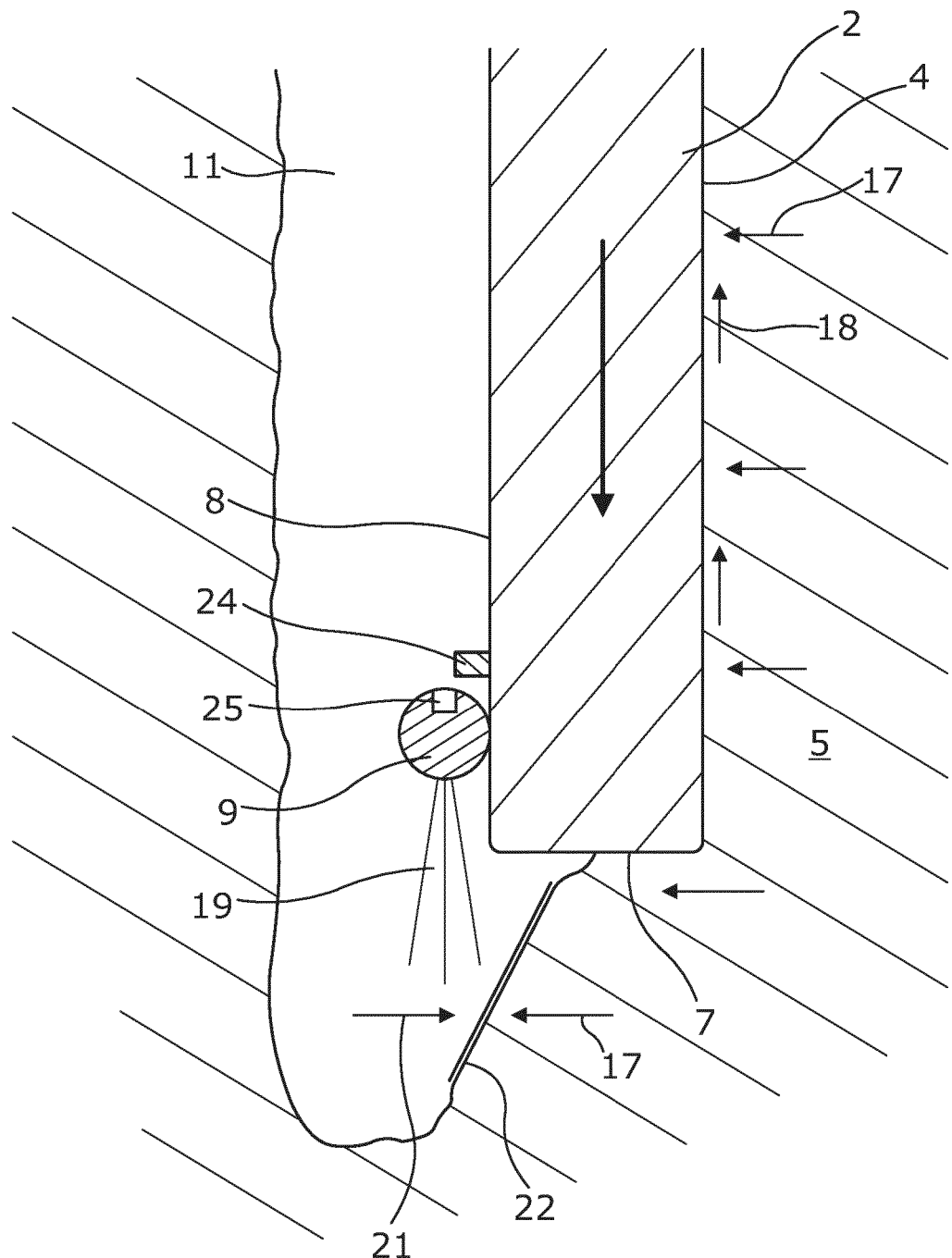
FIG. 2 shows an enlarged schematic cross-sectional view of the toe of the foundation shown in FIG. 1.

FIG. 2 shows an enlarged schematic cross-sectional view of the toe 7 as it penetrates through the soil 5. The fluid 19 jetted from cutting nozzles 9 cuts down into the soil and forms a suspension in the soil region adjacent to toe 7, thereby separating the soil 5 adjacent the interior surface 8 of the body 2 from the foundation body 2 itself. The fluid builds and forms a communication channel 11 which extends upwardly over the interior surface 8 of the body 2 to the proximal end of the internal cavity above the seabed (see FIG. 1). The establishment of this communication channel 11 means that pressure changes at the proximal end of the internal cavity may directly influence the suspension pressure of the fluid at the distal end, in the region adjacent the toe 7.

In this connection, as the foundation body 2 is driven down, its interior and exterior surfaces would be subjected to lateral earth pressures from the surrounding soil 5. This would then manifest as shaft resistance 18, which would resist installation.

As mentioned above, with the present arrangement, the cutting nozzles 9 act to cut into and excavate a section of the soil, thereby creating the fluid communication channel 11 which extends from a distal region beneath the toe 7, up to the proximal end of the internal cavity 12. As such, the lateral earth pressure that would otherwise be applied by the soil 5 to the interior surface 8 of the body 2 is removed. The exterior surface 4 of the body is still subjected to a lateral earth pressure 17 applied by the adjacent soil. However, in the cut away region beneath the toe 7, the absence of the pile body 2 means that this lateral pressure 17 is an active effective horizontal earth pressure. As such, at the front 22 between the soil and the suspension, the sum of the soil pore pressure u and this active effective horizontal earth pressure is countered by the fluid suspension pressure (P_sus) 21 of the opposing region of the fluid communication channel 11. Therefore, by controlling the suspension pressure P_sus 21 through the communication channel 11 using parameters set by the controller 16, the P_sus 21 can be matched to the lateral forces of the soil pore pressure and this active effective horizontal earth pressure, such that:

$$P\_sus >= \text{soil pore pressure} + \text{active effective horizontal earth pressure}$$

Accordingly, controller 16 may control the water table height using pump 13 and/or the flow rate of fluid jetted by cutting nozzles 9 in order to control the suspension pressure at the region adjacent the toe 7. Specifically, the controller may increase flow of fluid jetted by cutting nozzles 9 in order to decrease the suspension pressure P_sus 21. This may be countered by adding water from the water table within the internal cavity 12 using pump arrangement 13. Conversely, the suspension pressure may also be decreased by removing water from the internal cavity 12 using the pump arrangement 13. Similarly, in closed ended pile embodiments, the air pressure within the internal cavity 12 may be increased or decreased for varying the suspension pressure.

The suspension pressure P_sus 21 can be controlled so that it is sufficiently high to prevent ground failure where the external soil collapses into the jetted annulus. More importantly, hydraulic failure, which would significantly compromise the surrounding soil structure, can also be prevented. Hydraulic failure is particularly catastrophic because the suspension pressure drops below the adjacent pore pressure causing an influx of pore water into the jetted annulus. This pore water influx will rapidly erode soil at the erosion front, which is already unstable because the suspension pressure is not high enough to counteract the active earth pressure. Consequently, the erosion front will eat progressively outward into the surrounding soil structure, dramatically compromising the foundation's in-place stability.

At the same time as the above, the suspension pressure P_sus 21 can be controlled to be low enough to allow the soil 5 to relax radially inward into the fluid at front 22. This will thereby have the effect of releasing some of the lateral earth pressure 17 in the soil 5 radially adjacent to the front 22. As the toe 7 continues to advance downwardly, it moves into this region of relaxed soil 5. The advancing toe 7 thereby fixes the external lateral pressure 17 in the soil 5 at the magnitude it was at when it was countered by the suspension pressure 21. This allows the lateral earth pressure 17 applied to the exterior 4 of the foundation to be significantly reduced, which in turn reduces the shaft resistance 18. There will also be reduction in toe resistance as a by-product of the enhanced soil erosion at the toe 7, although this is a secondary factor to the overall installation resistance.

As the pile installation progresses and the toe 7 is driven deeper into the soil, the active effective horizontal earth pressure in the soil at front 22 will also generally increase. In homogeneous soil profiles, this increase will be substantially linear. However, in a layered soil profile, the increase will be non-linear as the active effective horizontal earth pressure coefficient will vary with soil type. Some soil layers may also present a reduced active effective horizontal earth pressure. As a consequence, in order to maintain the reduction in installation resistance, whilst avoiding detrimental ground or hydraulic failure, the controller 16 will vary the suspension pressure as the toe 7 is driven deeper into the soil, with the overall trend being for the suspension pressure to increase with depth.

In this connection, in this embodiment, the controller 16 controls the pump arrangement 13 and/or the jetting influx through nozzles 9 during the installation processes to maintain a target suspension pressure, which varies with the toe 7 depth. This target suspension pressure may be based on the estimated characteristics of the soil. For example, prior to installation, modelling may be used to determine a target suspension pressure as a function of depth, taking into account factors such as the weight of the foundation, any additional ballast that will be used, the jetting configuration, and the specific soil conditions and characteristics for where the foundation is to be installed. Based on this, the controller may then adjust the jetting pressure and water table height to attempt to match the actual suspension pressure to the target for a given toe depth. For this, the controller 16 may monitor inputs from feedback sensors. For example, the feedback sensors may include cutting nozzle flow sensor 25 and pump flow sensor 26 for indicating the flow rates at the cutting nozzles 9 and the pump 13, respectively. In embodiments, the controller may monitor suspension pressure directly, for example using a pressure sensor 24 provided near the distal end of the pile.

The controller 16 may also monitor installation resistance using installation resistance sensor 23 and compare this to a predicted installation resistance calculated as part of the modelling phase. If during installation, the installation resistance increases faster than predicted, the controller may for example lower the suspension pressure to reduce the resistance. The controller 16 may also reduce the installation speed to increase erosion of the soil by the cutting jets 9.

Accordingly, with the above arrangement, by creating a jetted region beneath the toe 7 and controlling the suspension pressure in the communication channel 11, the outer wall friction 18 can be reduced, thereby reducing the downward force required to facilitate installation. As such, the pile driving resistance may be reduced to such an extent that, in some soils, the pile may be installed under its own weight, or with minimal additional ballast. Consequently, this may avoid or reduce the need to use impact hammers to facilitate pile installation.

Figure 3:
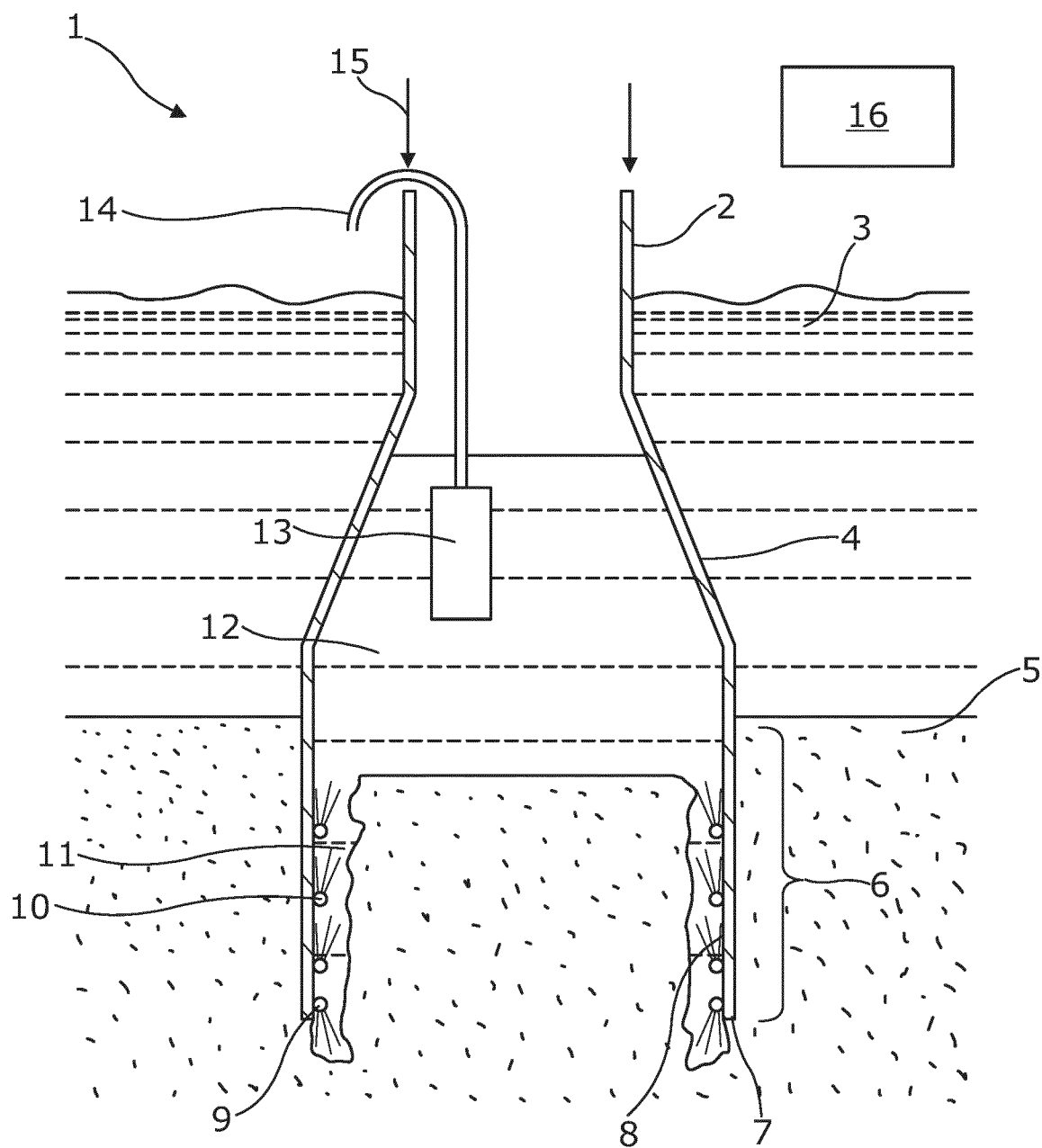
FIG. 3 shows a schematic cross-sectional view of a foundation according to a second embodiment of the invention.

FIG. 3 shows a schematic cross-sectional view of a foundation according to a second embodiment of the invention. This second embodiment operates in substantially the same way to the first embodiment shown in FIGS. 1 and 2, except that it further comprises a second nozzle array having a plurality of separating nozzles 10 which are distributed circumferentially and axially over the interior surface 8 of the insertion section 6. The separating nozzles 10 provide a distribution of jets for helping to maintain the separation between the interior surface 8 and the opposing soil 5, around the internal circumference of the body and vertically up along its axis. As such, the separating nozzles 10 function as a means for maintaining the communication channel 11 open by preventing soil from the internal soil column from relaxing back into contact with the pile 2. In this embodiment, the separating nozzles 10 are shown as being directed proximally for jetting fluid upward toward the internal cavity 12 of the foundation above the soil 5. This would thereby promote an upward flow of fluid through channel 11 for transporting sediment, as well as creating a pressure against the downward facing hydrostatic pressure. In other embodiments, the separating nozzles 10 may be directed radially inward or tangentially.

Accordingly, it will therefore be appreciated that with the above methods and arrangements, a foundation may be installed into the soil more easily. This reduces cost and allows installation noise to be minimised. After the foundation has been installed to the required depth, the fluid jetting system may be turned off to allow the surplus water to drain from the region as the soil particles settle and compact over time through cyclic shake down effects, thereby restabilising the soil.

It will be understood that the embodiments illustrated above show applications of the invention only for the purposes of illustration. In practice the invention may be applied to many different configurations, the detailed embodiments being straightforward for those skilled in the art to implement.

For example, whilst the above embodiments use jetting pressure and fluid evacuation rate to control suspension pressure, it will be understood that other control parameters may be additionally used.

In this connection, for example, additional ballast may be used to increase the total weight of the foundation and hence the downward driving force applied. As such, the controller 16 may account for the total weight of the foundation during installation by adjusting the jetting and pumping rates appropriately.

The controller may also comprise means for controlling the installation speed, which may affect the rate at which the suspension pressure increases for a given jetting rate. For example, slower installation speeds will allow longer for the soil to be eroded by the jetting. The controller 16 may vary the installation speed in combination with other parameters.

It will also be understood that additional mechanisms and systems may be also used in combination with the fluid jetting system for further reducing driving resistance. For instance, the foundation may further incorporate electrodes for electro-osmosis. As such, the fluid jetting system may work synergistically with the electro-osmosis system.

It will also be understood that although the means for maintaining the communication channel 11 in the second embodiment uses separating nozzles 10, other means are also envisaged. For example, a drill mechanism provided adjacent to the interior wall 8 may be used to maintain a communication channel 11.

Finally, although in the above illustrative embodiment, the foundation was a monopile, it will nevertheless be understood that other foundations are also possible, such as suction bucket foundations and jacket foundations. The present invention may also allow for simplified retraction of the foundation during decommissioning. In particular, the nozzles may be used to apply high pressure fluid for reducing friction over the surface of the foundation as it is withdrawn.

The invention claimed is:

1. A method of installing a foundation (1) for a structure comprising:
    inserting a foundation body (2) into a soil (5) in an insertion direction, where the body (2) has a toe (7) at its distal end which defines an aperture into an internal cavity (12) defined by an inner wall (8);
    jetting fluid from a plurality of nozzles (9) to form a fluid suspension in a fluid communication channel (11) between the inner wall (8) and the soil (5) wherein the fluid communication channel extends between a proximal end of the internal cavity (12) and the toe (7) and wherein the nozzles are provided at a distal end region of the body (2) for directing fluid distally into the soil (5) ahead of the toe (7); and
    controlling a pump arrangement (13) using a controller (16) to vary the quantity of fluid at the proximal end of the internal cavity (12) such that the fluid suspension pressure adjacent the toe (7) in the fluid communication channel (11) is varied, wherein the controller varies the fluid suspension pressure as the toe (7) inserts deeper into the soil (5) based on a target fluid suspension pressure as a function of toe depth.

2. The method according to claim 1, further comprising the step of controlling the rate of fluid jetted from the plurality of nozzles (9) to vary the fluid suspension pressure in the fluid communication channel (11).

3. The method according to claim 1, wherein the target fluid suspension pressure increases with toe depth.

4. The method according to claim 1, wherein the target fluid suspension pressure is determined based on the soil (5) characteristics.

5. The method according to claim 4, wherein the target fluid suspension pressure varies depending on the soil type in different soil layers.

6. The method according to claim 1, wherein the target fluid suspension pressure is determined based on an estimated active earth pressure coefficient.

7. The method according to claim 1, further comprising the step of determining a target fluid suspension pressure as a function of toe depth before the step of jetting fluid from a plurality of nozzles (9).

8. The method according to claim 1, wherein the step of controlling the pump arrangement (13) using the controller (16) comprises the step of controlling based on received sensor inputs, wherein the received sensor inputs comprise an input corresponding to the fluid suspension pressure adjacent the toe (7) and/or an input corresponding to the installation resistance.

9. The method according to claim 1, further comprising varying the quantity of fluid at a proximal end of the internal cavity (12), which comprises the pump arrangement (13) pumping water out of the internal cavity (12) and/or feeding water into the internal cavity (12).

10. The method according to claim 1, further comprising keeping the fluid communication channel (11) open between the proximal end of the internal cavity (12) and the toe (7) using means for separating the inner wall (8) and the soil (5).

11. A foundation (1) for a structure comprising:
    a foundation body (2) for insertion into a soil (5) in an insertion direction, where the body (2) has a toe (7) at its distal end which defines an aperture into an internal cavity (12) defined by an inner wall (8);
    a plurality of nozzles (9) provided at a distal end region of the body (2) for jetting fluid distally into the soil (5) ahead of the toe (7) to form a fluid suspension in a fluid communication channel (11) between the inner wall (8)

and the soil (5) wherein the fluid communication channel extends between a proximal end of the internal cavity (12) and the toe (7);
a pump arrangement (13) for varying the quantity of fluid at a proximal end of the internal cavity (12); and
a controller (16) for controlling the pump arrangement (13) to vary the quantity of fluid at the proximal end of the internal cavity (12) such that the fluid suspension pressure adjacent the toe (7) in the fluid communication channel (11) is varied, wherein the controller varies the fluid suspension pressure as the toe (7) inserts deeper into the soil (5) based on a target fluid suspension pressure as a function of toe depth.

12. The foundation according to claim 11, further comprising:
a pressure sensor (24) for determining the fluid suspension pressure; and
an installation resistance sensor (23) for determining the resistance to the foundation body's insertion into a soil (5), wherein the step of controlling the pump arrangement (13) using the controller (16) comprises the step of controlling based on sensor inputs received from the pressure sensor and the installation resistance sensor.

13. The foundation (1) according to claim 11, further comprising:
means for maintaining (10) the fluid communication channel (11).

14. A controller (16) for controlling the installation of a foundation (1) for a structure, the foundation comprising a foundation body (2) for insertion into a soil (5) in an insertion direction, where the body (2) has a toe (7) at its distal end which defines an aperture into an internal cavity (12) defined by an inner wall (8), the controller comprising:
a jetting control for controlling the jetting of fluid from a plurality of nozzles (9) provided at a distal end region of the body (2) for directing fluid distally into the soil (5) ahead of the toe (7) to form a fluid suspension in a fluid communication channel (11) between the inner wall (8) and the soil (5) wherein the fluid communication channel extends between a proximal end of the internal cavity (12) and the toe (7); and
a pump control for controlling a pump arrangement (13) for varying the quantity of fluid at a proximal end of the internal cavity (12),
wherein the controller (16) is configured to vary the quantity of fluid at the proximal end of the internal cavity (12) such that the fluid suspension pressure adjacent the toe (7) in a fluid communication channel (11) is varied, wherein the controller varies the fluid suspension pressure as the toe (7) inserts deeper into the soil (5) based on a target fluid suspension pressure as a function of toe depth.

* * * * *